Jan. 10, 1961  H. SCHULZ  2,967,507
DEVICE FOR RENDERING FLOATABLE ARTICLES
OF ALL KINDS, ESPECIALLY VEHICLES
Filed Nov. 29, 1957  2 Sheets-Sheet 1

INVENTOR:
Hans Schulz
By Lowry & Rinehart
ATTYS.

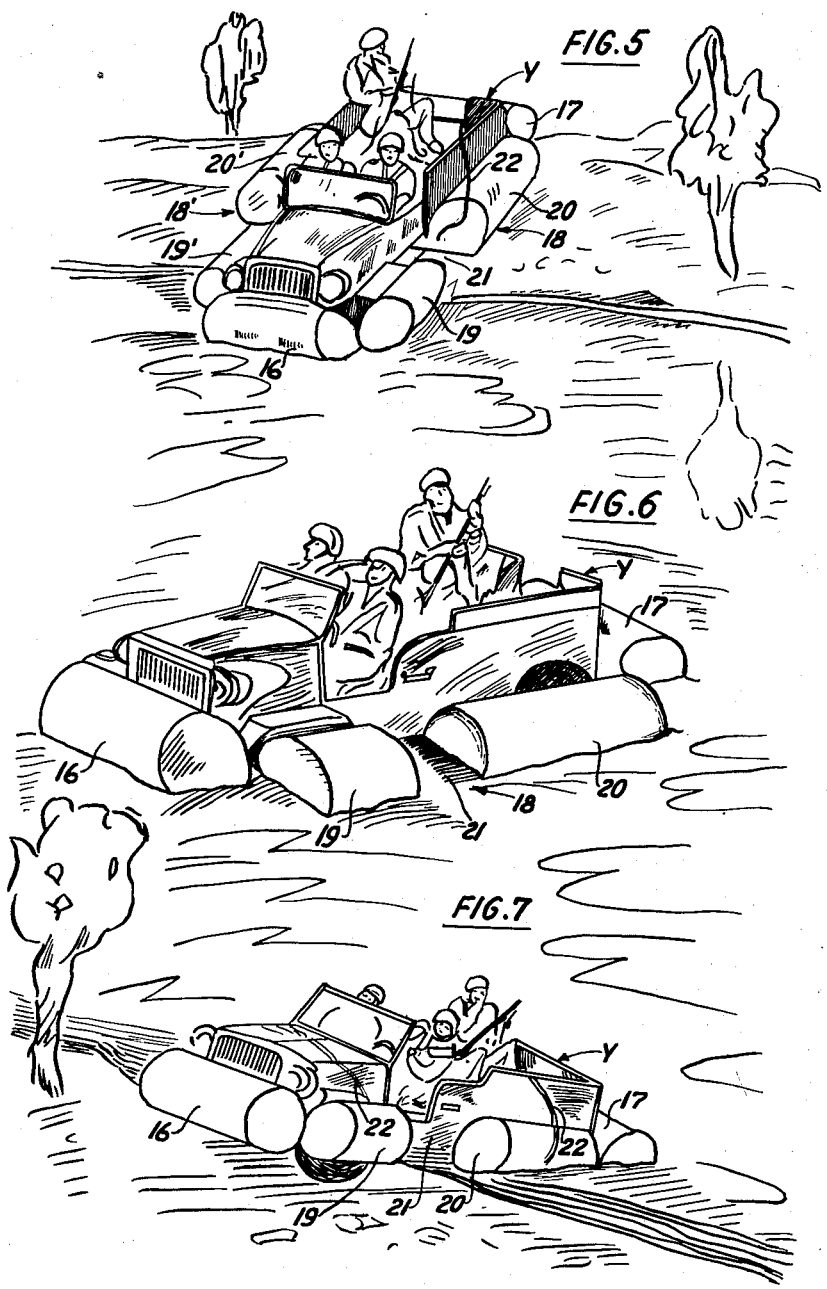

United States Patent Office 2,967,507
Patented Jan. 10, 1961

2,967,507

DEVICE FOR RENDERING FLOATABLE ARTICLES OF ALL KINDS, ESPECIALLY VEHICLES

Hans Schulz, 15 Kaiser Friedrich Strasse, Hildesheim, Germany

Filed Nov. 29, 1957, Ser. No. 699,749

Claims priority, application Germany Dec. 3, 1956

4 Claims. (Cl. 115—1)

This invention relates to a device for rendering floatable articles of all kinds, especially vehicles, so as to transport such articles, which normally sink in water, by floating them in the water.

The transport of articles which do not float, particularly vehicles, over a river or the like is difficult if there are no bridges or watercraft available. This mode of transport is of primary importance in war time when bridges are blown up and is only possible with the aid of boats, which require a great amount of transport space.

Air rafts and similar transporting arrangements are already known which float on the water. They can only be used on water. Vehicles are also in use which are amphibious and can travel both on land and on the water. These vehicles need to be specially prepared to render them floatable in water, or are provided with air containers rigidly connected to them.

It is the object of the invention to render articles of all kinds, especially vehicles, floatable with the aid of one or more carpet-like carriers, like lifesaving jackets. These carriers are inflated with air or the like and provided with attaching means for being wrapped around the article to be carried at least underneath and at the sides. The carpet-like carrier can be folded into a small packet when not in use and is easy to transport.

The carpet-like carrier can be built up from several carrier sections, according to the size and weight of the article to be transported. Each carrier is divided up into separate inflatable air chambers which are provided with check valves. The carrier is preferably made from elastic plastic material.

The carrier or carriers can be provided with apertures for the wheels and other driving parts of vehicles, when it or they are to be used on a vehicle. The individual carrier sections are fixed on the underside of the vehicle and on the sides thereof. They are interconnected by ropes or the like and adhere to the vehicle.

In the case of a motor vehicle, in which the wheels thereof project through the inflatable carrier, the driving wheels can serve as propelling means in that preferably flexible parts like snow chains can be fitted on the driving wheels and have lateral blades for propelling the vehicle in the water when the wheels are driven. However, it is also possible to propel such a vehicle by oars or paddles when it is floating on the water.

It is easily possible to fit together the individual carriers or sections for different types of vehicles by interconnecting these and attaching them to the vehicle by ropes or the like.

The carpet-like carrier can also be used as a raft, a tent and as cover for a vehicle.

Several preferred embodiments of the invention are illustrated by way of example in the accompanying drawings in which:

Figs. 5 to 7 are three perspective views of a motor vehicle rendered floatable, in the process of crossing a river.

Figure 1:
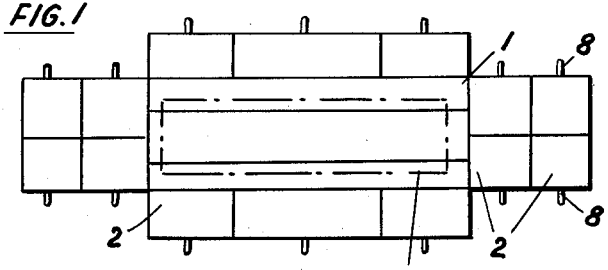
Fig. 1 is a top plan view of a carrier spread out like a carpet.
Figure 2:
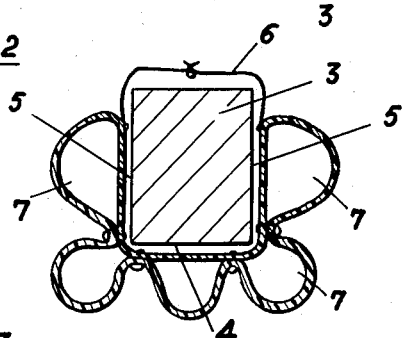
Fig. 2 is a cross section through a box-shaped article wrapped with a carrier in inflated condition.

As shown in Figs. 1 and 2, the carpet-like carrier 1 is composed of several individual chambers 2 which can be inflated separately or jointly and which serve for wrapping an article 3 at least on its underside 4 and at its sides 5. The carrier parts are interconnected and fixed on the article to be carried by attachment ropes 6. The carrier 1, after being inflated, forms separate air chambers 7 with the result that the article 3 is floatable. The individual chambers are inflatable through check-valves 8. The carrier 1 can also be composed of several carrier sections which are interconnected by the ropes 6. The individual carriers are built up according to the size and weight of the article to be transported on the water.

Figure 3:
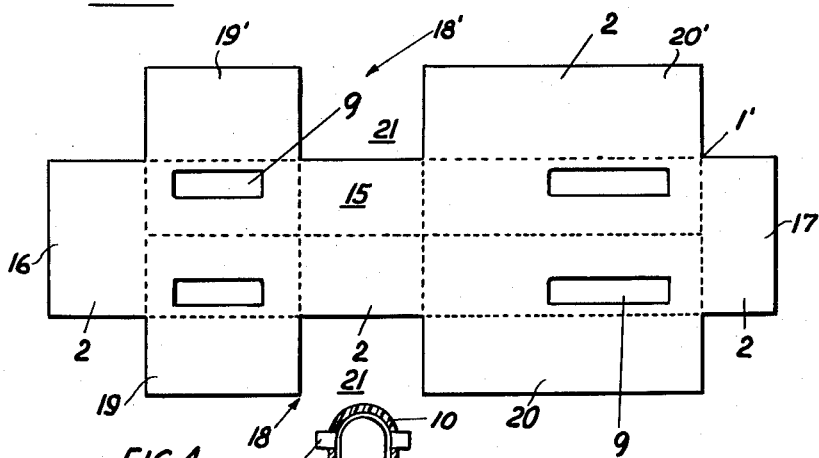
Fig. 3 is a top plan view of a carpet-like carrier for a vehicle with four wheels, spread out and not inflated.

Fig. 3 shows a carrier 1' for a motor vehicle. This carrier is provided with four apertures 9 for the vehicle wheels. When the carrier has been fitted on the vehicle and the chambers 2 filled with air a floatable motor vehicle as illustrated in Figs. 5 to 7 is produced. It will be observed that the embodiment of Fig. 3 includes a central substantially rectangular section 15 which will support the underside of the vehicle V of Figs. 5–7 when it is driven upon the carrier with the wheels in alignment with the apertures 9. Hingedly secured to the central section 15 are forward and rear sections 16, 17, respectively, and side sections indicated generally at 18, 18' including opposite side portions 19, 19' and 20, 20'. A space 21, 21' is provided between the portions 19, 20 and 19', 20' to provide ready ingress and egress from the converted amphibious vehicle whether it is used on land or water.

The conventional land vehicle V is readily driven onto the carrier 1' where after the lashings 22 are used to secure the inflated sections onto the vehicle. The entire procedure will involve a relatively short period of time and the convertible vehicle would be especially desirable during floods, wartime and the like, wherever immediate and ready conversion are prime requisites.

Figure 4:
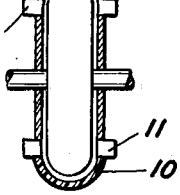
Fig. 4 shows the fitting of lateral blades on the wheels of a vehicle.

To attain propulsion in water by the driving wheels of the motor vehicle, these can be provided with preferably flexible attachments 10 like snow chains and which have lateral blades 11, as shown in Fig. 4. The vehicles can also travel on land when fitted with the attachments 10, 11 serving for propulsion in water.

The carpet-like carrier can, when used on a military vehicle, be composed of elastic synthetic material or even bullet-proof synthetic material so that any bullet-holes will close automatically, such material being shown in Patent 2,391,477, issued December 25, 1945, to E. C. Phillips.

To enable the floating motor vehicle to be steered, the front wheels serving for steering can be provided with rudder-like surfaces. These surfaces can be connected with the front wheels in a suitable manner and when the wheels are veered by the steering wheel of the vehicle, the rudder surfaces are set so that the propelled floating vehicle is also steered.

From the above detailed decription of the invention, it is believed that the construction will at once be apparent, and while there are herein shown and described several preferred embodiments of the invention, it is nevertheless to be understood that minor changes may be made therein without departing from the spirit and scope of the invention as claimed.

I claim:

1. A conversion raft for rendering vehicles amphibious comprising a one-piece foldable and portable buoyant carrier including a central portion for engaging and supporting the underside of a vehicle, said central portion including a plurality of transverse wheel aperture portions for receiving the wheels of a land vehicle therethrough to convert the said vehicle to an amphibious vehicle, said foldable carrier including laterally projecting end and side sections hingedly connected to said central section for engaging the ends and sides of said vehicle to afford stability during travel on the water.

2. The structure of claim 1; said carrier comprising a plurality of individually inflated compartments.

3. The structure of claim 1; said side sections including a pair of spaced portions for affording ready ingress and egress from the vehicle.

4. The structure of claim 3; said carrier comprising a plurality of individually inflated compartments.

References Cited in the file of this patent

UNITED STATES PATENTS

| | | |
|---|---|---|
| 2,497,857 | Benson | Feb. 21, 1950 |
| 2,657,716 | Ford | Nov. 3, 1953 |
| 2,715,231 | Marston | Aug. 16, 1955 |
| 2,850,252 | Ford | Sept. 2, 1958 |